United States Patent
Oh et al.

(10) Patent No.: US 11,895,420 B2
(45) Date of Patent: Feb. 6, 2024

(54) RAMP GENERATOR INCLUDING EMPHASIS CIRCUIT AND PRE-EMPHASIS CIRCUIT, OPERATION METHOD THEREOF, AND IMAGE SENSOR DEVICE INCLUDING THE RAMP GENERATOR

(71) Applicant: Samsung Electronics Co., Ltd., Suwon-si (KR)

(72) Inventors: Myeongjin Oh, Incheon (KR); Jaejung Park, Hwaseong-si (KR); Hyosang Kim, Yongin-si (KR); Sukho Shin, Suwon-si (KR); Haneul Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 113 days.

(21) Appl. No.: 17/718,450

(22) Filed: Apr. 12, 2022

(65) Prior Publication Data
US 2023/0053956 A1 Feb. 23, 2023

(30) Foreign Application Priority Data
Aug. 18, 2021 (KR) .......................... 10-2021-0108797

(51) Int. Cl.
*H04N 25/75* (2023.01)
*H04N 25/77* (2023.01)
*H04N 25/673* (2023.01)

(52) U.S. Cl.
CPC ........... *H04N 25/75* (2023.01); *H04N 25/673* (2023.01); *H04N 25/77* (2023.01)

(58) Field of Classification Search
CPC .... H04N 25/65; H04N 25/673; H04N 25/745; H04N 25/75; H04N 25/766; H04N 25/77; H03K 3/037; H03K 4/06; H03K 4/08; H03K 4/90; H03K 19/20; H03M 1/12; H03M 1/34; H03M 1/56
See application file for complete search history.

(56) References Cited

U.S. PATENT DOCUMENTS

| 8,154,267 | B2 | 4/2012 | Noda |
| 9,055,250 | B2 | 6/2015 | Park et al. |
| 9,166,614 | B2 | 10/2015 | Higuchi et al. |
| 9,307,173 | B2 | 4/2016 | Takamiya et al. |

(Continued)

FOREIGN PATENT DOCUMENTS

JP 2016-048813 A 4/2016

*Primary Examiner* — Lin Ye
*Assistant Examiner* — Chriss S Yoder, III
(74) *Attorney, Agent, or Firm* — HARNESS, DICKEY & PIERCE, P.L.C.

(57) ABSTRACT

In an example embodiment, a ramp generator includes a ramp circuit that receives a first ramp enable signal from a control circuit during a first ramp period, the first ramp period including a first reset period and a first sensing period, and the ramp circuit being configured to output a first ramp signal to a correlated double sampling circuit; an emphasis circuit that increases a voltage level of the first ramp signal during the first reset period, based on a first enable signal received from the control circuit; and a pre-emphasis circuit that further increases the voltage level of the first ramp signal during a first pre-emphasis period in the first reset period, based on a second enable signal received from the control circuit.

20 Claims, 13 Drawing Sheets

(56) References Cited

U.S. PATENT DOCUMENTS 10,498,993 B1  12/2019  Ebihara et al.
10,826,470 B2  11/2020  Zuo et al.
11,652,952 B2 *  5/2023  Bae ..................... H04N 25/616
　　　　　　　　　　　　　　　　　　　　348/241

* cited by examiner

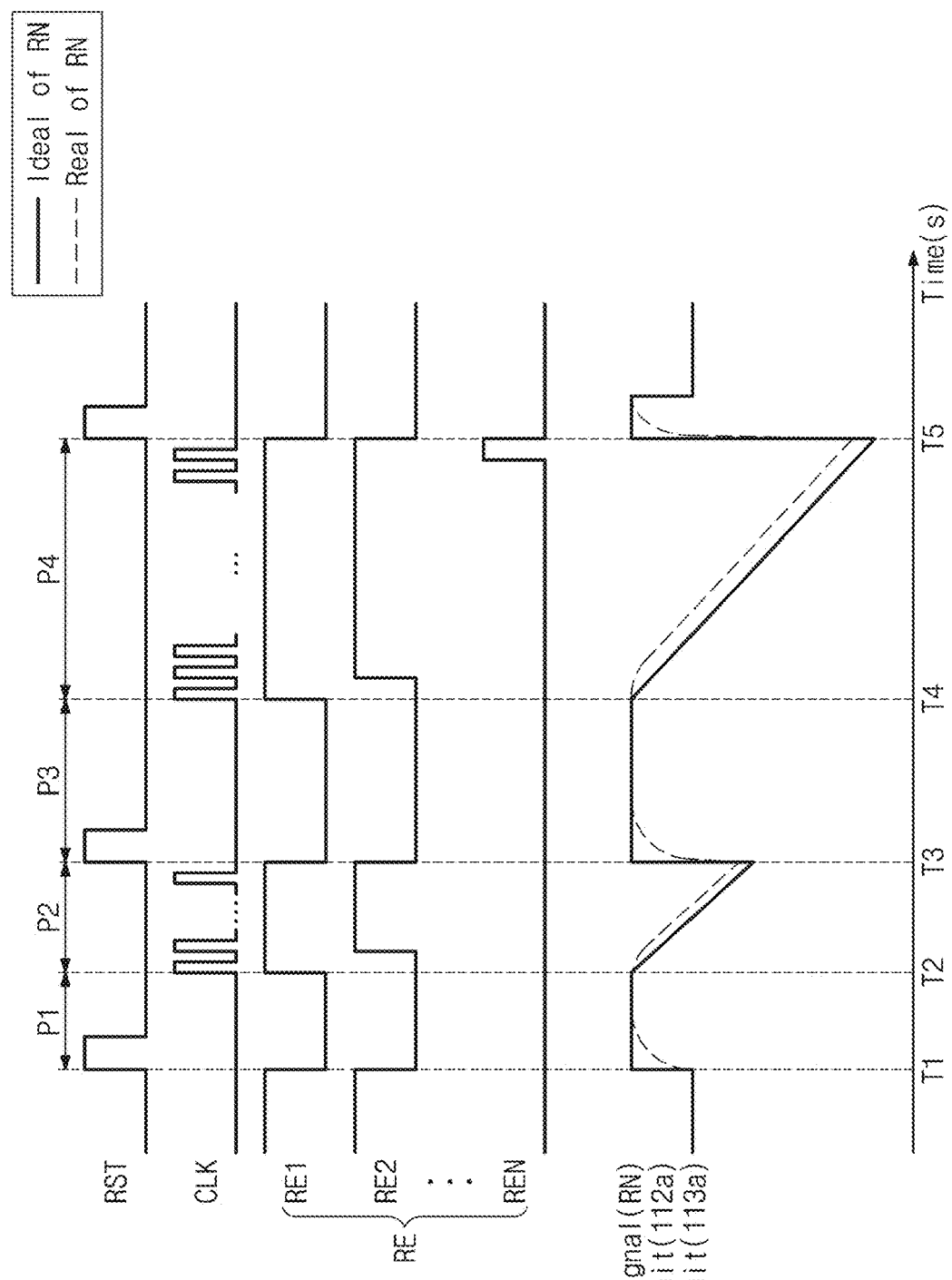

RAMP GENERATOR INCLUDING EMPHASIS CIRCUIT AND PRE-EMPHASIS CIRCUIT, OPERATION METHOD THEREOF, AND IMAGE SENSOR DEVICE INCLUDING THE RAMP GENERATOR

CROSS-REFERENCE TO RELATED APPLICATIONS

This application claims priority under 35 U.S.C. § 119 to Korean Patent Application No. 10-2021-0108797 filed on Aug. 18, 2021, in the Korean Intellectual Property Office, the disclosures of which are incorporated by reference herein in their entireties.

BACKGROUND

Embodiments of the present disclosure described herein relate to a ramp generator, and more particularly, relate to a ramp generator including an emphasis circuit and a pre-emphasis circuit, a method of operating the ramp generator, and/or an image sensor device including the ramp generator.

An image sensor converts a light incident from the outside into an electrical signal. The image sensor is classified as a complementary metal-oxide-semiconductor (CMOS) image sensor or a charge coupled device (CCD) image sensor. Because it is possible to manufacture the CMOS image sensor through a general-purpose semiconductor manufacturing device, the CMOS image sensor may be relatively inexpensive compared to the CCD image sensor. Compared to the CMOS image sensor, the CCD image sensor may obtain an image of an improved quality.

The CMOS image sensor may include a correlated double sampling (CDS) circuit. Because the CDS circuit operates based on a ramp signal, when the ramp signal decreases non-linearly, the probability that an error occurs in an operation of the CDS circuit may increase. Therefore, there is a desire to improve the linearity of the ramp signal.

SUMMARY

Some example embodiments of the present disclosure provide a ramp generator including an emphasis circuit and a pre-emphasis circuit, a method of operating the ramp generator, and/or an image sensor device including the ramp generator.

According to an embodiment, a ramp generator includes a ramp circuit that receives a first ramp enable signal from a control circuit during a first ramp period, the first ramp period including a first reset period and a first sensing period, and the ramp circuit being configured to output a first ramp signal to a correlated double sampling (CDS) circuit; an emphasis circuit that increases a voltage level of the first ramp signal during the first reset period, based on a first enable signal received from the control circuit; and a pre-emphasis circuit that further increases the voltage level of the first ramp signal during a first pre-emphasis period in the first reset period, based on a second enable signal received from the control circuit.

According to an embodiment, an image sensor device includes a pixel circuit that outputs a pixel signal based on an external light signal, a ramp generator that outputs a first ramp signal, a correlated double sampling (CDS) circuit that performs correlated sampling based on the pixel signal and the first ramp signal, and a control circuit that is connected with the pixel circuit, the CDS circuit, and the ramp generator and the control circuit generates a first ramp enable signal, a first enable signal, and a second enable signal. The ramp generator includes a ramp circuit that receives the first ramp enable signal during a first ramp period, the first ramp period including a first reset period and a first sensing period, and the ramp generator being configured to output the first ramp signal to the CDS circuit, an emphasis circuit that receives the first enable signal from the control circuit and increases a voltage level of the first ramp signal during the first reset period, based on the first enable signal, and a pre-emphasis circuit that receives the second enable signal from the control circuit and further increases the voltage level of the first ramp signal during a first pre-emphasis period in the first reset period, based on the second enable signal.

According to an embodiment, a method of operating a ramp generator includes receiving a ramp enable signal, a first enable signal, and a second enable signal from the control circuit during a ramp period, generating the ramp signal based on the ramp enable signal, the first enable signal, and the second enable signal, and outputting the ramp signal to a correlated double sampling (CDS) circuit. The generating of the ramp signal includes generating the ramp signal based on the ramp enable signal during the ramp period, increasing a voltage level of the ramp signal based on the first enable signal, during an emphasis period in the ramp period, and further increasing the voltage level of the ramp signal based on the second enable signal, during a pre-emphasis period in the ramp period, and a length of the pre-emphasis period is shorter than a length of the emphasis period.

According to an embodiment, a ramp generator includes a ramp circuit that receives a first ramp enable signal, a first enable signal, and a second enable signal from a control circuit during a ramp period, and outputs a first ramp signal to a correlated double sampling (CDS) circuit; an emphasis circuit that generates a first portion of a voltage level of the first ramp signal based on the first enable signal, during an emphasis period in the ramp period; and a pre-emphasis circuit that generates a second portion of the voltage level of the first ramp signal based on the second enable signal, during a pre-emphasis period in the ramp period. A length of the pre-emphasis period is shorter than a length of the emphasis period.

BRIEF DESCRIPTION OF THE FIGURES

The above and other objects and features of the present disclosure will become apparent by describing in detail embodiments thereof with reference to the accompanying drawings.

FIG. 4 is a timing diagram for describing an operation of a conventional ramp circuit.

DETAILED DESCRIPTION

Below, some embodiments of the present disclosure will be described in detail and clearly to such an extent that one skilled in the art easily carries out the present disclosure. With regard to the description of the present disclosure, to make the overall understanding easy, like components will be marked by like reference signs/numerals in drawings, and thus, additional description will be omitted to avoid redundancy.

Figure 1:
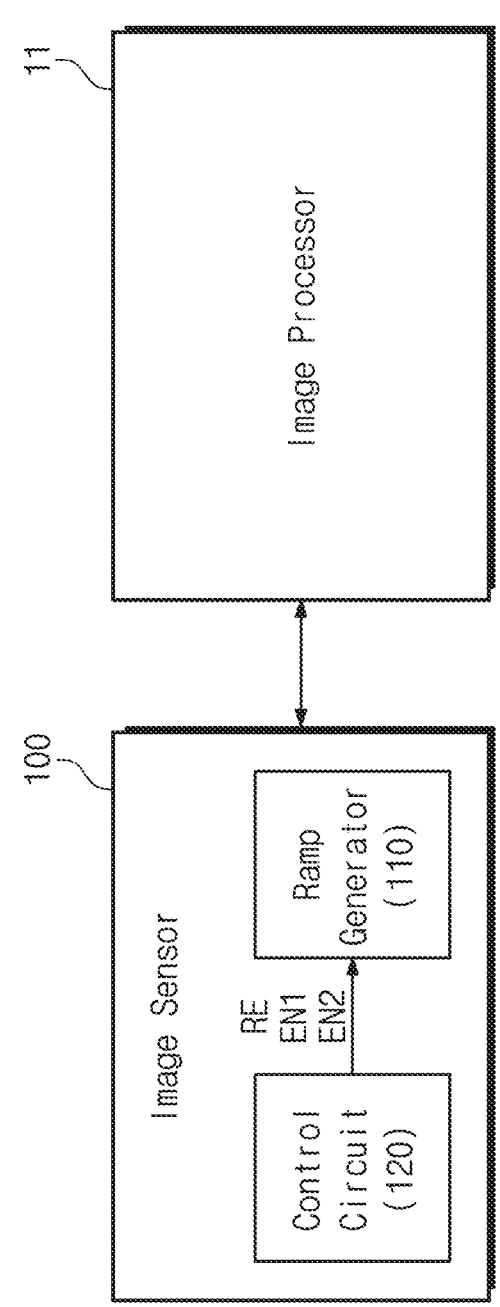
FIG. 1 is a block diagram of an electronic device including a ramp generator according to an embodiment of the present disclosure.

FIG. 1 is a block diagram of an electronic device according to an embodiment of the present disclosure. An electronic device 10 is illustrated in FIG. 1. The electronic device 10 may refer to a device that detects a light reflected from an external object and processes image data. For example, the electronic device 10 may be implemented with one of various types of electronic devices such as a smartphone, a tablet personal computer (PC), a laptop PC, and a wearable device.

Referring to FIG. 1, the electronic device 10 may include an image sensor 100 and an image processor 11. The image sensor 100 may operate under control of the image processor 11. For example, the image sensor 100 may detect a light reflected from the external object, may convert the detected light into an electrical signal, and may provide the electrical signal to the image processor 11 as image data. The image processor 11 may receive image data from the image sensor 100 and may process the image data.

The image sensor 100 may include a control circuit 120 and a ramp generator 110. The ramp generator 110 may generate a ramp signal. The ramp generator 110 may generate the ramp signal based on a ramp enable signal RE, a first enable signal EN1, and a second enable signal EN2. The ramp enable signal RE may be a signal that allows the ramp generator 110 to generate the ramp signal. The first enable signal EN1 and the second enable signal EN2 may be signals that allow the ramp generator 110 to control a voltage level of the ramp signal.

The control circuit 120 may output the ramp enable signal RE, the first enable signal EN1, and the second enable signal EN2 to the ramp generator 110. The control circuit 120 may control the ramp generator 110.

The image processor 11 may communicate with the image sensor 100. The image processor 11 may control an operation of the image sensor 100. For example, under control of the image processor 11, the control circuit 120 may output a signal to the ramp generator 110. The image processor 11 may receive image data generated by the image sensor 100. The image processor 11 may store the image data in a storage device or may output the image data to a display device.

Figure 2:
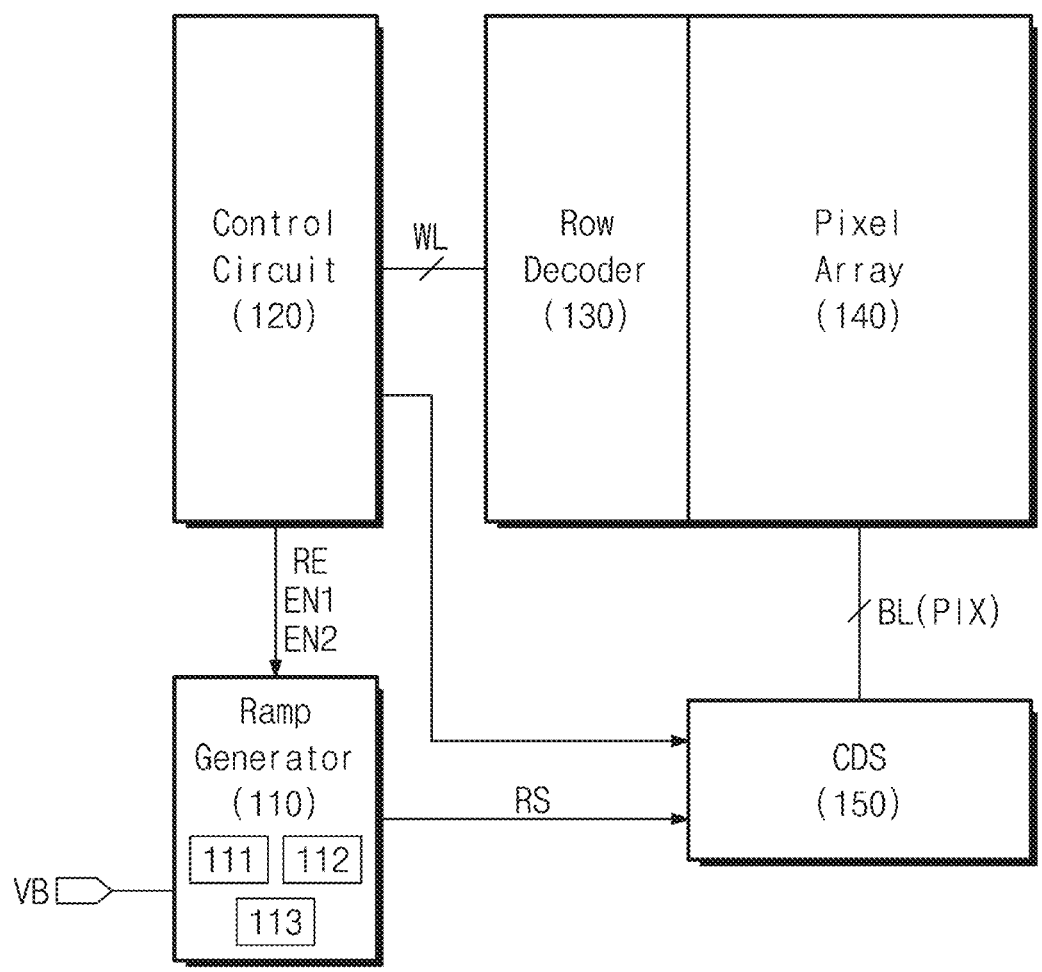
FIG. 2 is a block diagram of an image sensor device including a ramp generator according to an embodiment of the present disclosure.

FIG. 2 is a block diagram illustrating an image sensor of FIG. 1 in detail, according to an embodiment of the present disclosure. Referring to FIGS. 1 and 2, the image sensor 100 may include the ramp generator 110, the control circuit 120, a row decoder 130, a pixel array 140, and a correlated double sample (CDS) circuit 150.

The ramp generator 110 may be configured to generate a ramp signal RS. The ramp signal RS may be a signal that increases or decreases linearly during a specific period. That is, the ramp signal RS may be a signal that increases or decreases depending on a given slope.

The ramp generator 110 may receive the ramp enable signal RE, the first enable signal EN1, and the second enable signal EN2 from the control circuit 120. The ramp generator 110 may receive a bias signal VB from the outside. For example, the ramp generator 110 may receive the bias signal VB from a power circuit (not illustrated). The bias signal VB may be a signal that provides a voltage for operation of the ramp generator 110. A magnitude of the ramp signal RS of the ramp generator 110 may be controlled by a magnitude of the bias signal VB.

The ramp generator 110 may include a ramp circuit 111, an emphasis circuit 112, and a pre-emphasis circuit 113. The ramp circuit 111 may generate the ramp signal RS based on the ramp enable signal RE. The emphasis circuit 112 may control a voltage level of the ramp signal RS based on the first enable signal EN1. The pre-emphasis circuit 113 may control a voltage level of the ramp signal RS based on the second enable signal EN2. As such, the ramp generator 110 may output the ramp signal RS having the improved linearity of an increasing or decreasing period to the CDS circuit 150. This will be described in more detail with reference to FIGS. 3A, 3B, and 5A.

The control circuit 120 may communicate with the image processor 11. The control circuit 120 may control the ramp generator 110, the row decoder 130, and the CDS circuit 150 under control of the image processor 11. The control circuit 120 may output the ramp enable signal RE, the first enable signal EN1, and the second enable signal EN2 to the ramp generator 110. The control circuit 120 may receive a reset signal and a clock signal from the image processor 11. The control circuit 120 may disable the pre-emphasis circuit 113 based on a length of a toggling period of the clock signal. This will be described in more detail with reference to FIG. 5A.

The row decoder 130 may be connected with the pixel array 140 through word lines WL. The row decoder 130 may control the word lines WL under control of the control circuit 120. In an embodiment, lines connecting the row decoder 130 and the pixel array 140 may be variously changed depending on a structure of the plurality of pixels included in the pixel array 140.

The pixel array 140 may include the plurality of pixels. The plurality of pixels may be arranged in a row direction and a column direction. Pixels belonging to the same column may be connected with the same bit line BL. Pixels belonging to the same row may be connected with the same word line WL. Each of the plurality of pixels of the pixel array 140 may output a pixel signal PIX depending on the intensity or the amount of light received from the outside. In this case, the pixel signal PIX may be an analog signal that corresponds to the intensity or the amount of light received from the outside.

The CDS circuit 150 may perform a correlated double sampling operation. The CDS circuit 150 may remove an offset component present in a signal by sampling a signal value based on a reference value. In an embodiment, the CDS circuit 150 may receive the ramp signal RS from the ramp generator 110 and may receive the pixel signal PIX through a bit line. The CDS circuit 150 may output a comparison signal based on the ramp signal RS and the pixel signal PIX. The CDS circuit 150 may include a comparator that compares the ramp signal RS and the pixel signal PIX.

For example, the CDS circuit 150 may output a signal having logic high during a period in which a voltage level of the ramp signal RS is higher than a voltage level of the pixel signal PIX. The CDS circuit 150 may output a signal having logic low during a period in which a voltage level of the ramp signal RS is lower than a voltage level of the pixel signal PIX. That is, the CDS circuit 150 may perform the role of a comparator.

When the CDS circuit 150 receives the ramp signal RS decreasing non-linearly, the probability that an error occurs in an operation of the CDS circuit 150 may increase. Therefore, there is a desire to improve the linearity of a decreasing period of the ramp signal RS.

Figure 3A:
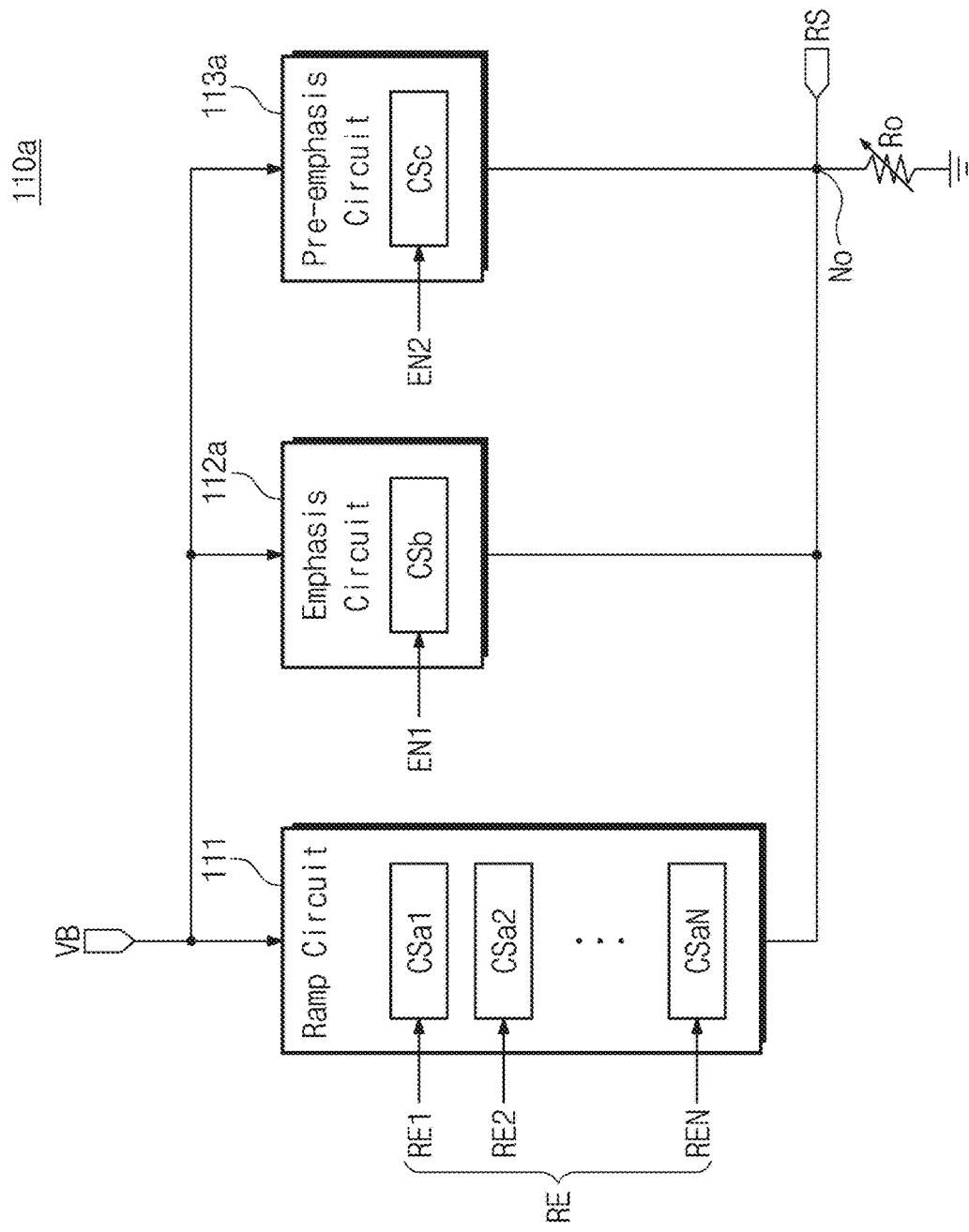
FIG. 3A is a block diagram of a ramp generator according to an embodiment of the present disclosure.

FIG. 3A is a block diagram of a ramp generator according to an embodiment of the present disclosure. Referring to FIG. 3A, a ramp generator 110a may include the ramp circuit 111, an emphasis circuit 112a, a pre-emphasis circuit 113a, and an output resistor Ro.

The ramp circuit 111 may generate the ramp signal RS based on the bias signal VB and the ramp enable signal RE, during a ramp period from a first time point to a second time point. The ramp period may include a reset period and a sensing period. The reset period may be a period in which a voltage level of the ramp signal RS does not decrease. The sensing period may be a period in which a voltage level of the ramp signal RS decreases linearly.

The ramp circuit 111 may receive the bias signal VB from a power circuit (not illustrated). The ramp circuit 111 may receive the ramp enable signal RE from the control circuit 120. The ramp enable signal RE may include a plurality of ramp enable signals RE1 to REN.

The ramp circuit 111 may include a plurality of current sources CSa1 to CSaN. Each of the plurality of current sources CSa1 to CSaN may operate in response to the bias signal VB. For example, each of the plurality of current sources CSa1 to CSaN may be enabled in response to the bias signal VB. The plurality of current sources CSa1 to CSaN may operate in response to the plurality of ramp enable signals RE1 to REN, respectively.

For example, the first current source CSa1 may generate the ramp signal RS in response to the first ramp enable signal RE1. The second current source CSa2 may generate the ramp signal RS in response to the second ramp enable signal RE2. The N-th current source CSaN may generate the ramp signal RS in response to the N-th ramp enable signal REN. This will be described in greater detail with respect to FIG. 6.

The emphasis circuit 112a may be connected with the ramp circuit 111 through an output node No. The output node No may be a node to which the ramp signal RS is output. The emphasis circuit 112a may receive the bias signal VB from the power circuit. The emphasis circuit 112a may receive the first enable signal EN1 from the control circuit 120. A voltage level of the first enable signal EN1 may be a first logic level in a period between the first time point and a third time point earlier than the second time point, and may be changed from the first logic level to a second logic level at the third time point. For example, the first logic level may be referred to as "logic low", and the second logic level may be referred to as "logic high".

The emphasis circuit 112a may control a voltage level of the ramp signal RS during the reset period, based on the bias signal VB and the first enable signal EN1. In an embodiment, the emphasis circuit 112a may generate a first portion of the voltage level of the ramp signal RS, based on the bias signal VB and the first enable signal EN1. The first portion of the voltage level of the ramp signal RS will be described in detail with reference to FIG. 5B.

The emphasis circuit 112a may include an emphasis current source CSb. The emphasis current source CSb may operate in response to the first enable signal EN1. The emphasis current source CSb may include a plurality of transistors. This will be described in greater detail with respect to FIG. 6.

The pre-emphasis circuit 113a may be connected with the ramp circuit 111 and the emphasis circuit 112 through the output node No. The pre-emphasis circuit 113a may receive the bias signal VB from the power circuit. The pre-emphasis circuit 113a may receive the second enable signal EN2 from the control circuit 120. A voltage level of the second enable signal EN2 may be the first logic level in a period between the first time point and a fourth time point earlier than the third time point, and may be changed from the first logic level to the second logic level at the fourth time point.

The pre-emphasis circuit 113a may control a voltage level of the ramp signal RS during a pre-emphasis period in the reset period, based on the bias signal VB and the second enable signal EN2. A length of the pre-emphasis period may be shorter than a length of the reset period. In an embodiment, the pre-emphasis circuit 113a may generate a second portion of the voltage level of the ramp signal RS, based on the bias signal VB and the second enable signal EN2. The second portion of the voltage level of the ramp signal RS will be described in detail with reference to FIG. 5B.

The pre-emphasis circuit 113a may include a pre-emphasis current source CSc. The pre-emphasis current source CSc may operate in response to the second enable signal EN2. The pre-emphasis current source CSc may include a plurality of transistors. This will be described in greater detail with respect to FIG. 6.

The output resistor Ro may be connected with the ramp circuit 111, the emphasis circuit 112a, and the pre-emphasis circuit 113a through the output node No. The output resistor Ro may be connected between the output node No and a ground node for receiving a ground voltage. The output resistor Ro may be a variable resistor. In an embodiment, magnitudes of the first portion and the second portion may be proportional to a resistance value of the output resistor Ro.

Figure 3B:
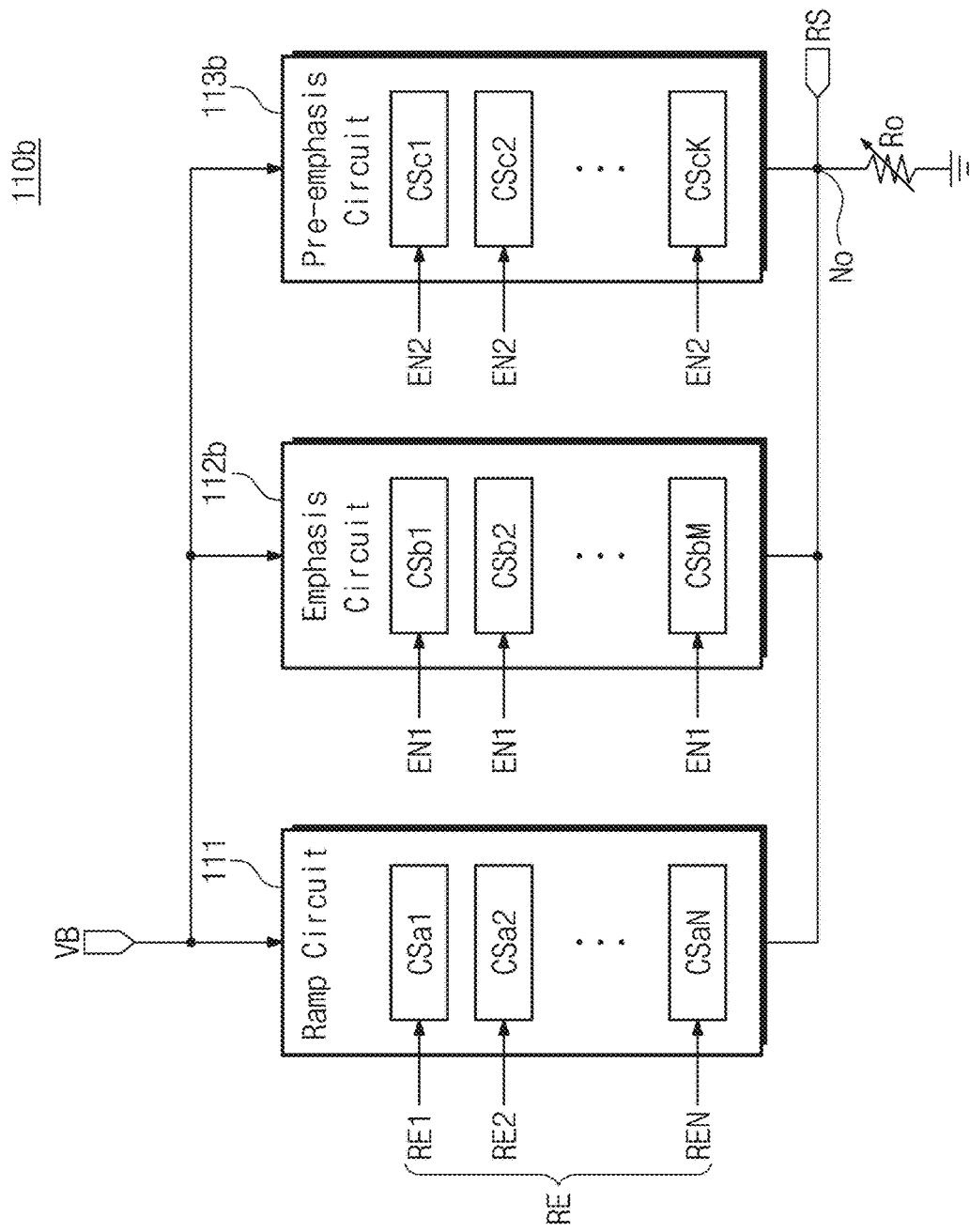
FIG. 3B is a block diagram of a ramp generator according to an embodiment of the present disclosure.

FIG. 3B is a block diagram of a ramp generator according to an embodiment of the present disclosure. Referring to FIG. 3B, a ramp generator 110b may include the ramp circuit 111, an emphasis circuit 112b, a pre-emphasis circuit 113b, and the output resistor Ro. Characteristics of the ramp circuit 111, the emphasis circuit 112b, the pre-emphasis circuit 113b, and the output resistor Ro are the same as or similar to those of the ramp circuit 111, the emphasis circuit 112a, the pre-emphasis circuit 113a, and the output resistor Ro, and thus, only differences will be described to avoid redundancy.

The emphasis circuit 112b may control the ramp signal RS based on the first enable signal EN1. In an embodiment, the emphasis circuit 112b may include a plurality of emphasis current sources CSb1 to CSbM. Each of the plurality of emphasis current sources CSb1 to CSbM may receive the first enable signal EN1 from the control circuit 120. Each of the plurality of emphasis current sources CSb1 to CSbM may control the first portion of the ramp signal RS based on the first enable signal EN1. A magnitude of the first portion may correspond to the number of emphasis current sources included in the emphasis circuit 112b. For example, as the number of emphasis current sources CSb1 to CSbM included in the emphasis circuit 112b increases, the magnitude of the first portion may increase.

The pre-emphasis circuit 113b may control the ramp signal RS based on the second enable signal EN2. In an embodiment, the pre-emphasis circuit 113b may include a plurality of pre-emphasis current sources CSc1 to CScK. Each of the plurality of pre-emphasis current sources CSc1 to CScK may receive the second enable signal EN2 from the control circuit 120. Each of the plurality of pre-emphasis current sources CSc1 to CScK may control the second portion of the ramp signal RS based on the second enable signal EN2. A magnitude of the second portion may correspond to the number of pre-emphasis current sources CSc1 to CScK included in the pre-emphasis circuit 113b. For example, as the number of pre-emphasis current sources CSc1 to CScK included in the pre-emphasis circuit 113b increases, the magnitude of the second portion may increase.

The number of the current sources CSa1 to CSaN, the number of the emphasis current sources CSb1 to CSbM, and the number of the pre-emphasis current sources CSc1 to CScK may be different from each other. For example, the ramp circuit 111 may include 124 current sources CSa1 to CSa124, the emphasis circuit 112b may include 144 emphasis current sources CSb1 to CSb144, and the pre-emphasis circuit 113b may include 128 pre-emphasis current sources CSc1 to CSc128.

FIG. 4 is a timing diagram for describing an operation of a conventional ramp circuit. Referring to FIGS. 2, 3A, and 4, the ramp circuit 111 may generate a ramp signal RN based on the ramp enable signal RE. For brevity of drawing and convenience of description, components that are unnecessary to describe an embodiment of the present disclosure are omitted. Also, the timing diagram of FIG. 4 is schematically illustrated, and real driving waveforms of a conventional ramp generator may be different from waveforms illustrated in FIG. 4.

The control circuit 120 may generate the ramp enable signal RE in response to a reset signal RST and a clock signal CLK. The ramp enable signal RE may include the first to N-th ramp enable signals RE1 to REN.

When the reset signal RST is at logic high, the clock signal CLK and the first to N-th ramp enable signals RE1 to REN may be maintained at logic low. For example, at a first time point T1, based on the reset signal RST of logic high, the clock signal CLK and the first to N-th ramp enable signals RE1 to REN may be set to logic low.

When the reset signal RST is at logic low, the clock signal CLK may be at logic low or may be at logic high. When the clock signal CLK is at logic high, at least one of the first to N-th ramp enable signals RE1 to REN may be set to logic high. For example, at a second time point T2, based on the clock signal CLK of logic high, the first ramp enable signal RE1 may be set to logic high. That is, as the clock signal CLK toggles during a second period P2 from T2 to T3, the number of ramp enable signals being at logic low from among the first to N-th ramp enable signals RE1 to REN may decrease.

The ramp circuit 111 may generate the ramp signal RN based on the first to N-th ramp enable signals RE1 to REN, during a first ramp period from T1 to T3. That is, the ramp signal RN may be a signal, the voltage level of which is not controlled by the emphasis circuit 112a and the pre-emphasis circuit 113a.

In an embodiment, the first to N-th current sources CSa1 to CSaN of the ramp circuit 111 may operate in response to the first to N-th ramp enable signals RE1 to REN, respectively. For example, the first current source CSa1 may be enabled in response to the first ramp enable signal RE1 of logic low. The first current source CSa1 may be disabled in response to the first ramp enable signal RE1 of logic high.

During a first period P1 from T1 to T2, the first to N-th current sources CSa1 to CSaN may be enabled based on whether the first to N-th ramp enable signals RE1 to REN are at logic low. The first period P1 may be the reset period. That is, the ramp circuit 111 may generate the ramp signal RN having a reset voltage level, based on the first to N-th ramp enable signals RE1 to REN being at logic low. The reset voltage level may be a voltage level of the ramp signal RS that the first to N-th current sources CSa1 to CSaN enabled generate.

During the second period P2, as the number of ramp enable signals being at logic low from among the first to N-th ramp enable signals RE1 to REN decreases, the number of enabled current sources may decrease. The second period P2 may be the sensing period. That is, the ramp circuit 111 may generate the ramp signal RN whose voltage level decreases. An operation that is performed after the third time point T3 is the same as or similar to that in the period from T1 to T3, and thus, additional description will be omitted to avoid redundancy.

Also, a length of the period in which a voltage level of the ramp signal RN decreases may be determined based on the reset signal RST and the clock signal CLK. For example, the number of current sources that are disabled while the clock signal CLK toggles in a state where the reset signal RST is at logic low may increase. That is, as a toggling period of the clock signal CLK increases in a state where the reset signal RST is at logic low, a voltage level of the ramp signal RN may become much smaller.

For example, a fourth period P4 from T4 to T5 may be longer than the second period P2. In this case, as illustrated in FIG. 4, the N-th ramp enable signal REN may be at logic low in the second period P2 but may be set to logic high in the fourth period P4. That is, because the number of current sources disabled during the fourth period P4 is more than the number of current sources disabled during the second period P2, a voltage level of the ramp signal RN decreased during the fourth period P4 may be smaller than a voltage level of the ramp signal RN decreased during the second period P2.

Referring to FIG. 4, a waveform of a solid line indicates an ideal waveform of the ramp signal RN, and a waveform of a dotted line indicates a real waveform of the ramp signal RN. Referring to the real waveform of the ramp signal RN, the ramp signal RN may decrease non-linearly in the second period P2 and the fourth period P4.

When the CDS circuit 150 performs a sampling operation based on the ramp signal RS decreasing non-linearly, the probability that an error occurs may increase. Therefore, there is a desire to decrease an error rate of the CDS circuit 150. That is, there is a desire to improve the linearity of a decreasing period of the ramp signal RN.

Also, for example, in the case where the clock signal CLK has a frequency higher than or equal to a reference frequency (e.g., about 1.5 GHz) and a resistance value of the output resistor Ro does not change, because a high-speed operation is performed without a change of a time constant of the CDS circuit 150, it may be difficult to sufficiently secure a period in which the CDS circuit 150 is stabilized. For this end, in the case of decreasing a resistance value of the output resistor Ro, power consumption of the ramp circuit 111 may increase. That is, even though there is generated the ramp signal RN whose linearity is maintained in a state where the high-speed clock signal CLK is used, there is a desire to reduce power consumption of the ramp circuit 111.

Figure 5A:
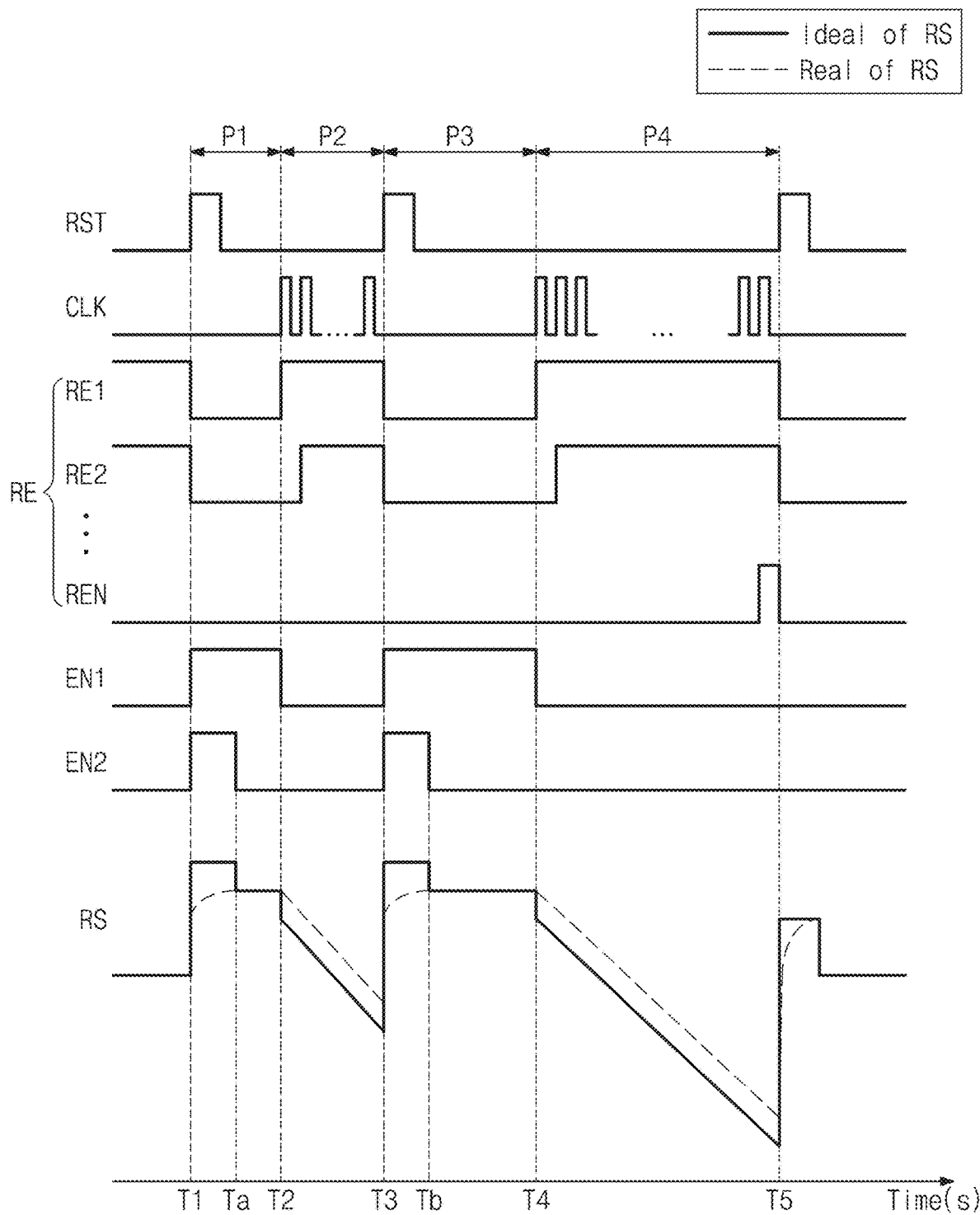
FIG. 5A is a timing diagram for describing an operation of a ramp generator according to an embodiment of the present disclosure.

FIG. 5A is a timing diagram for describing an operation of a ramp generator according to an embodiment of the present disclosure. Referring to FIGS. 2, 3A, and 5A, the ramp generator 110a may generate the ramp signal RS based on the ramp enable signal RE, the first enable signal EN1, and the second enable signal EN2. For brevity of drawing and convenience of description, components that are unnecessary to describe an embodiment of the present disclosure are omitted. Also, the timing diagram of FIG. 5A is schematically illustrated, and real driving waveforms of a conventional ramp generator may be different from waveforms illustrated in FIG. 5A. The reset signal RST, the clock signal CLK, and the ramp enable signal RE of FIG. 5A are the same as or similar to the reset signal RST, the clock signal CLK, and the ramp enable signal RE of FIG. 4, and thus, only differences are described to avoid redundancy.

During the first period P1 from T1 to T2, the ramp circuit 111 may generate the ramp signal RS having the reset voltage level, based on the first to N-th ramp enable signals RE1 to REN being at logic low.

In the first period P1, the emphasis circuit 112a may control a voltage level of the ramp signal RS based on the first enable signal EN1. In detail, the emphasis circuit 112a may increase a voltage level of the ramp signal RS during the first period P1, based on the first enable signal EN1 being at logic high. The voltage level of the first enable signal EN1 may be illustrated as being changed from logic low to logic high at the first time point T1, but the present disclosure is not limited thereto. For example, the voltage level of the first enable signal EN1 may be set to logic high before the first time point T1.

In an embodiment, the emphasis circuit 112a may include NMOS transistors, and the NMOS transistors may increase the voltage level of the ramp signal RS during the first period P1, based on the first enable signal EN1 being at logic high. During the first period P1, as the emphasis circuit 112a increases the voltage level of the ramp signal RS, the linearity of the ramp signal RS after the second time point T2 may be improved.

However, the present disclosure is not limited thereto. The emphasis circuit 112a may include PMOS transistors, and the first enable signal EN1 may have a logic level opposite to that illustrated in FIG. 5A (e.g., the first enable signal EN1 may be maintained at logic low in the first and third periods P1 and P3). The PMOS transistors may increase a voltage level of the ramp signal RS during the first period P1, based on the first enable signal EN1 being at logic low.

In a period from T1 to Ta, the pre-emphasis circuit 113a may control the voltage level of the ramp signal RS based on the second enable signal EN2. The period from T1 to Ta may be a pre-emphasis period.

In detail, the pre-emphasis circuit 113a may further increase the voltage level of the ramp signal RS during the period from T1 to Ta, based on the second enable signal EN2 being at logic high. The voltage level of the second enable signal EN2 may be illustrated as being changed from logic low to logic high at the first time point T1, but the present disclosure is not limited thereto. For example, the voltage level of the second enable signal EN2 may be set to logic high before the first time point T1.

In an embodiment, the pre-emphasis circuit 113a may include NMOS transistors, and the NMOS transistors may increase the voltage level of the ramp signal RS during the period from T1 to Ta, based on the second enable signal EN2 being at logic high.

In the period from T1 to Ta, as the pre-emphasis circuit 113a further increases the voltage level of the ramp signal RS, an operating speed of the CDS circuit 150 may be improved. For example, the initialization of comparators for a sampling operation of the CDS circuit 150 may be quickly performed.

However, the present disclosure is not limited thereto. The pre-emphasis circuit 113a may include PMOS transistors, and the second enable signal EN2 may have a logic level opposite to that illustrated in FIG. 5A (e.g., the second enable signal EN2 may be maintained at logic low in the period from T1 to Ta). The PMOS transistors may increase a voltage level of the ramp signal RS during the period from T1 to Ta, based on the second enable signal EN2 being at logic low.

An example in which the pre-emphasis circuit 113a further increases the voltage level of the ramp signal RS based on the second enable signal EN2 being at logic high is disclosed, but the present disclosure is not limited thereto. The pre-emphasis circuit 113a may further increase the voltage level of the ramp signal RS based on the second enable signal EN2 being at logic low.

During the second period P2, as the number of ramp enable signals being at logic low from among the first to N-th ramp enable signals RE1 to REN decreases, the number of enabled current sources may decrease. That is, the ramp circuit 111 may generate the ramp signal RN whose voltage level decreases. An operation in a period from T3 to Tb, an operation in a period from Tb to T4, and an operation in the second period P2 are the same as or similar to the operation in the period from T1 to Ta, the operation in the period from Ta to T2, and the operation in the fourth period P4 from T4 to T5, respectively, and thus, additional description will be omitted to avoid redundancy.

In an embodiment, the control circuit 120 may disable the pre-emphasis circuit 113a based on the reset signal RST and the clock signal CLK. As described above, a length of a period in which the voltage level of the ramp signal RS decreases may be determined based on a length of a period in which the clock signal CLK toggles.

For example, when the control circuit 120 determines that a length of the fourth period P4 is longer than a reference length, the control circuit 120 may disable the pre-emphasis circuit 113a. The reference length may be a reference used for determining whether to quickly perform the initialization of the comparators of the CDS circuit 150. That is, when a length of a period in which the sampling operation of the CDS circuit 150 is performed is longer than the reference length, there may be no need to quickly perform the initialization of the comparators. As the pre-emphasis circuit 113a is disabled, the ramp generator 110a may generate the ramp signal RS only based on the ramp circuit 111 and the emphasis circuit 112a.

Referring to FIG. 5A, a waveform of a solid line indicates an ideal waveform of the ramp signal RS, and a waveform of a dotted line indicates a real waveform of the ramp signal RS. Referring to real waveforms of the ramp signal RN of FIG. 4 and the ramp signal RS of FIG. 5A in the second period P2 and the fourth period P4, the real waveform of the ramp signal RS of FIG. 5A may decrease more linearly than the real waveform of the ramp signal RN of FIG. 4.

That is, the linearity of the ramp signal RS whose voltage level is controlled by the emphasis circuit 112 and the pre-emphasis circuit 113 may be improved. As such, the accuracy of an operation of the CDS circuit 150 may be improved.

The above embodiments are an example for describing an embodiment of the present disclosure clearly, and the present disclosure is not limited thereto. For example, the ramp signal RS may be generated based on any other signals in addition to the reset signal RST and the clock signal CLK or other than the reset signal RST and the clock signal CLK.

Figure 5B:
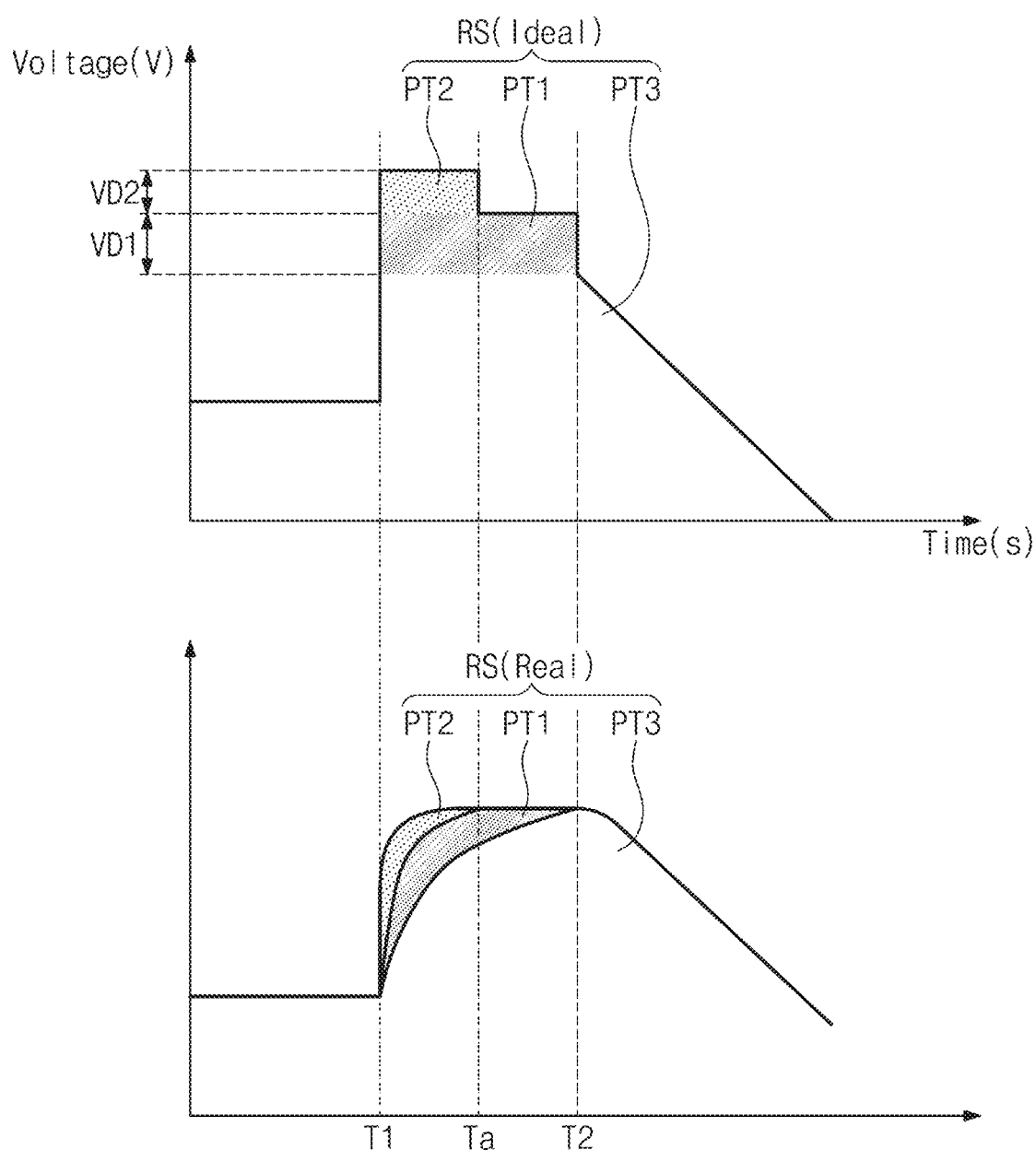
FIG. 5B is a diagram for describing an operation of a ramp generator according to an embodiment of the present disclosure.

FIG. 5B is a diagram for describing an operation of a ramp generator according to an embodiment of the present disclosure. Referring to FIGS. 3A and 5B, a first portion PT1, a second portion PT2, and a third portion PT3 of voltage levels of an ideal ramp signal RS and a real ramp signal RS are illustrated.

Referring to the ideal waveform of the ramp signal RS, in a period from T1 to T2, the emphasis circuit 112a may increase a voltage level of the ramp signal RS as much as a first voltage difference VD1. In the ideal waveform of the ramp signal RS, the first portion PT1 may be referred to as a portion where a voltage level is increased as much as the first voltage difference VD1. That is, the emphasis circuit 112a may generate the first portion PT1 of the voltage level of the ramp signal RS.

In a period from T1 to Ta, the pre-emphasis circuit 113a may increase the voltage level of the ramp signal RS as much as a second voltage difference VD2. In the ideal waveform of the ramp signal RS, the second portion PT2 may be referred to as a portion where a voltage level is increased as much as the second voltage difference VD2. That is, the pre-emphasis circuit 113a may generate the second portion PT2 of the voltage level of the ramp signal RS.

In the ideal waveform of the ramp signal RS, the ramp circuit 111 may generate the third portion PT3 of the voltage level of the ramp signal RS. The third portion PT3 may be a ramp signal whose voltage level is not increased by the emphasis circuit 112a and the pre-emphasis circuit 113a.

The first voltage difference VD1 and the second voltage difference VD2 may be proportional to a resistance value of the output resistor Ro.

Referring to the real waveform of the ramp signal RS, the ramp signal RS may include a first portion PT1, a second portion PT2, and a third portion PT3. The linearity of the ramp signal RS after the second time point T2 may be maintained by the first portion PT1 that the emphasis circuit 112a generates. For example, in the case where the clock signal CLK has a frequency higher than or equal to a reference frequency (e.g., about 1.5 GHz), the linearity of the ramp signal RS may be maintained by the first portion PT1.

Also, a period in which the CDS circuit 150 is stabilized may be sufficiently secured by the second portion PT2 that the pre-emphasis circuit 113a generates. As such, even in the case where the clock signal CLK has a frequency higher than or equal to a reference frequency (e.g., about 1.5 GHz), there is no need to use the output resistor Ro having a small resistance value for the purpose of securing the stabilization period of the CDS circuit 150. That is, the power consumption of the ramp generator 110 may be improved.

Magnitudes of the first portion PT1 and the second portion PT2 may be proportional to a resistance value of the output resistor Ro. When the emphasis circuit 112a and the pre-emphasis circuit 113a receive the same bias signal VB, the magnitudes of the first portion PT1 and the second portion PT2 may be the same as each other. When the emphasis circuit 112a and the pre-emphasis circuit 113a receive different bias signals, a magnitude of each of the first and second portions PT1 and PT2 may correspond to a voltage level of the corresponding bias signal. That is, the magnitude of the first portion PT1 and the magnitude of the second portion PT2 may be different from each other.

When the emphasis circuit 112a receives a first bias signal and the pre-emphasis circuit 113a receives a second bias signal, a magnitude of the first portion PT1 may be proportional to a level of the first bias signal, and a magnitude of the second portion PT2 may proportional to a level of the second bias signal. That is, when the emphasis circuit 112a and the pre-emphasis circuit 113a receive different bias signals, the magnitudes of the first and second portions PT1 and PT2 may be different from each other. For example, when the level of the first bias signal is higher than the level of the second bias signal, the magnitude of the first portion PT1 may be greater than the magnitude of the second portion PT2.

Figure 6:
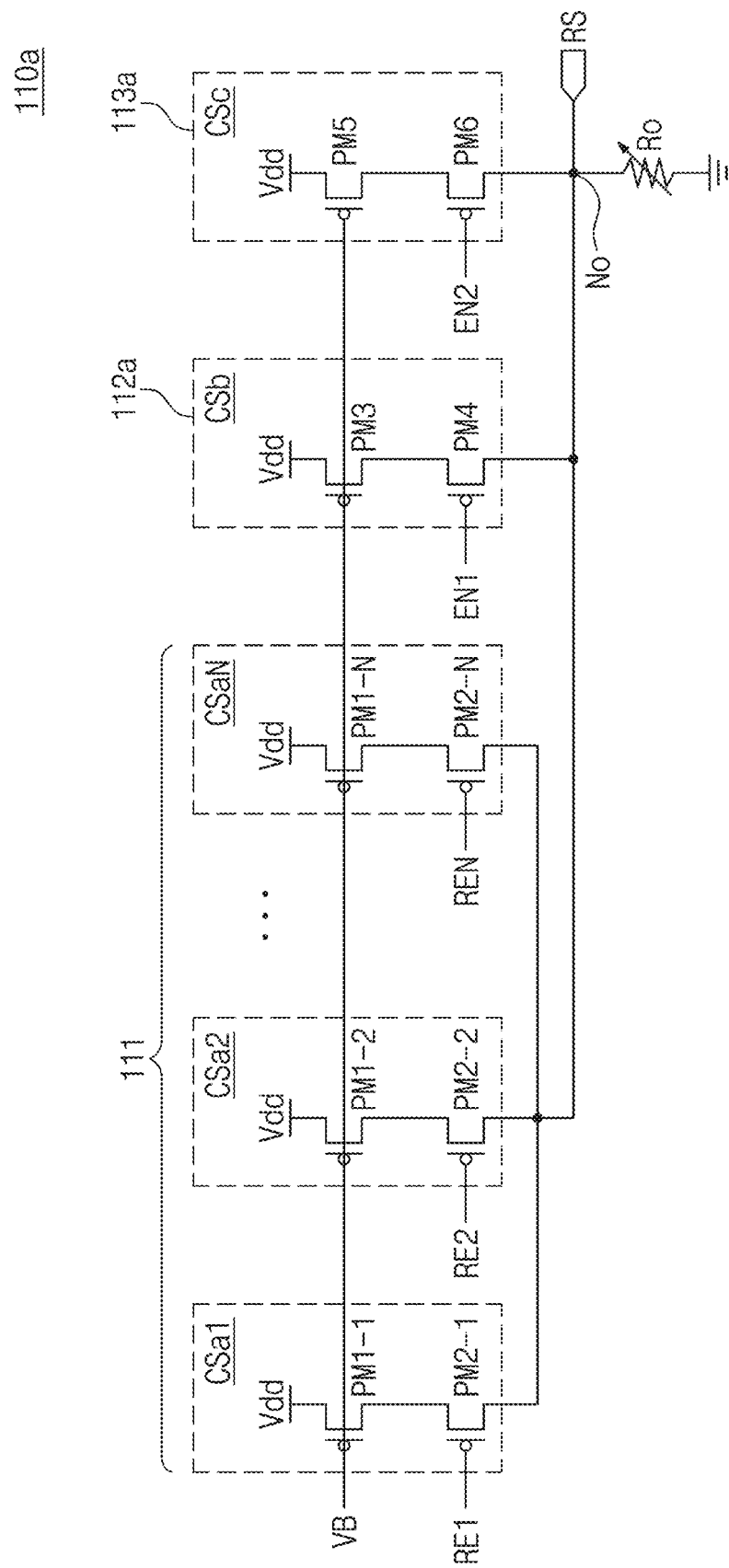
FIG. 6 is a circuit diagram illustrating a ramp generator of FIG. 3A in detail.

FIG. 6 is a circuit diagram illustrating a ramp generator of FIG. 3A in detail. The ramp generator 110 in which the ramp circuit 111, the emphasis circuit 112a, and the pre-emphasis circuit 113a are implemented with transistors is illustrated in FIG. 6 as an example. Characteristics of the ramp circuit 111, the emphasis circuit 112a, the pre-emphasis circuit 113a, and the output resistor Ro are the same as or similar to those of the ramp circuit 111, the emphasis circuit 112a, the pre-emphasis circuit 113a, and the output resistor Ro of FIG. 3A, and thus, additional description will be omitted to avoid redundancy.

The ramp circuit 111 may include the plurality of current sources CSa1 to CSaN. Each of the plurality of current sources CSa1 to CSaN may include a plurality of transistors. In an embodiment, the first current source CSa1 may include first and second PMOS transistors PM1-1 and PM2-1. The first and second PMOS transistors PM1-1 and PM2-1 may be connected in series between a power node for receiving a power supply voltage and the output node No for outputting the ramp signal RS. The first PMOS transistor PM1-1 may operate in response to the bias signal VB. The second PMOS transistor PM2-1 may operate in response to the first ramp enable signal RE1.

The second current source CSa2 to the N-th current source CSaN may be implemented to be the same as or similar to the first current source CSa1, but receive a different respective ramp enable signal. For example, the second current source CSa2 may include a first PMOS transistor PM1-2 operating in response to the bias signal VB and a second PMOS transistor PM2-2 operating in response to the second ramp enable signal RE2. The N-th current source CSaN may include a first PMOS transistor PM1-N operating in response to the bias signal VB and a second PMOS transistor PM2-N operating in response to the N-th ramp enable signal REN.

The emphasis circuit 112a may include the emphasis current source CSb. In an embodiment, the emphasis circuit 112a may be the emphasis current source CSb. The emphasis current source CSb may include third and fourth PMOS transistors PM3 and PM4. The third and fourth PMOS transistors PM3 and PM4 may be connected in series between the power node and the output node No. The third PMOS transistor PM3 may operate in response to the bias signal VB. The fourth PMOS transistor PM4 may operate in response to the first enable signal EN1. For example, the third PMOS transistor PM3 may be turned on in response to the bias signal VB of logic low, and the fourth PMOS transistor PM4 may be turned on in response to the first enable signal EN1 of logic low. However, the present disclosure is not limited thereto. For example, the third and fourth PMOS transistors PM3 and PM4 of the emphasis circuit 112a may be replaced with NMOS transistors.

As the bias signal VB is applied to both a gate node of the third PMOS transistor PM3 and a gate node of the first PMOS transistor PM1-1, the third PMOS transistor PM3 and the first PMOS transistor PM1-1 may operate as a current mirror circuit. That is, a magnitude of a current flowing through the third PMOS transistor PM3 may be determined based on a magnitude of a current flowing through the first PMOS transistor PM1-1. As such, the emphasis circuit 112a and the ramp circuit 111 may generate signals of the same current magnitude.

However, the present disclosure is not limited thereto. For example, in the case where the emphasis circuit 112a and the ramp circuit 111 receive bias signals of different levels, the emphasis circuit 112a and the ramp circuit 111 may generate signals having different current magnitudes.

The pre-emphasis circuit 113a may include the pre-emphasis current source CSc. In an embodiment, the pre-emphasis circuit 113a may be the pre-emphasis current source CSc. The pre-emphasis current source CSc may include fifth and sixth PMOS transistors PM5 and PM6. The fifth and sixth PMOS transistors PM5 and PM6 may be connected in series between the power node and the output node No. The fifth PMOS transistor PM5 may operate in response to the bias signal VB. The sixth PMOS transistor PM6 may operate in response to the second enable signal EN2. For example, the fifth PMOS transistor PM5 may be turned on in response to the bias signal VB of logic low, and the sixth PMOS transistor PM6 may be turned on in response to the second enable signal EN2 of logic low. However, the present disclosure is not limited thereto. For example, the fifth and sixth PMOS transistors PM5 and PM6 of the pre-emphasis circuit 113a may be replaced with NMOS transistors.

As the bias signal VB is applied to both the gate node of the third PMOS transistor PM3 and a gate node of the fifth PMOS transistor PM5, the third PMOS transistor PM3 and the fifth PMOS transistor PM5 may operate as a current mirror circuit. That is, a magnitude of a current flowing through the fifth PMOS transistor PM5 may be determined based on a magnitude of a current flowing through the third PMOS transistor PM3. As such, the emphasis circuit 112a and the pre-emphasis circuit 113a may generate signals of the same current magnitude.

Also, as described above, as the emphasis circuit 112a and the ramp circuit 111 generate signals having the same current magnitude, the ramp circuit 111, the emphasis circuit 112a, and the pre-emphasis circuit 113a may generate signals having the same current magnitude.

However, the present disclosure is not limited thereto. For example, in the case where the pre-emphasis circuit 113a and the ramp circuit 111 receive bias signals of different levels, the pre-emphasis circuit 113a and the ramp circuit 111 may generate signals having different current magnitudes.

Figure 7:
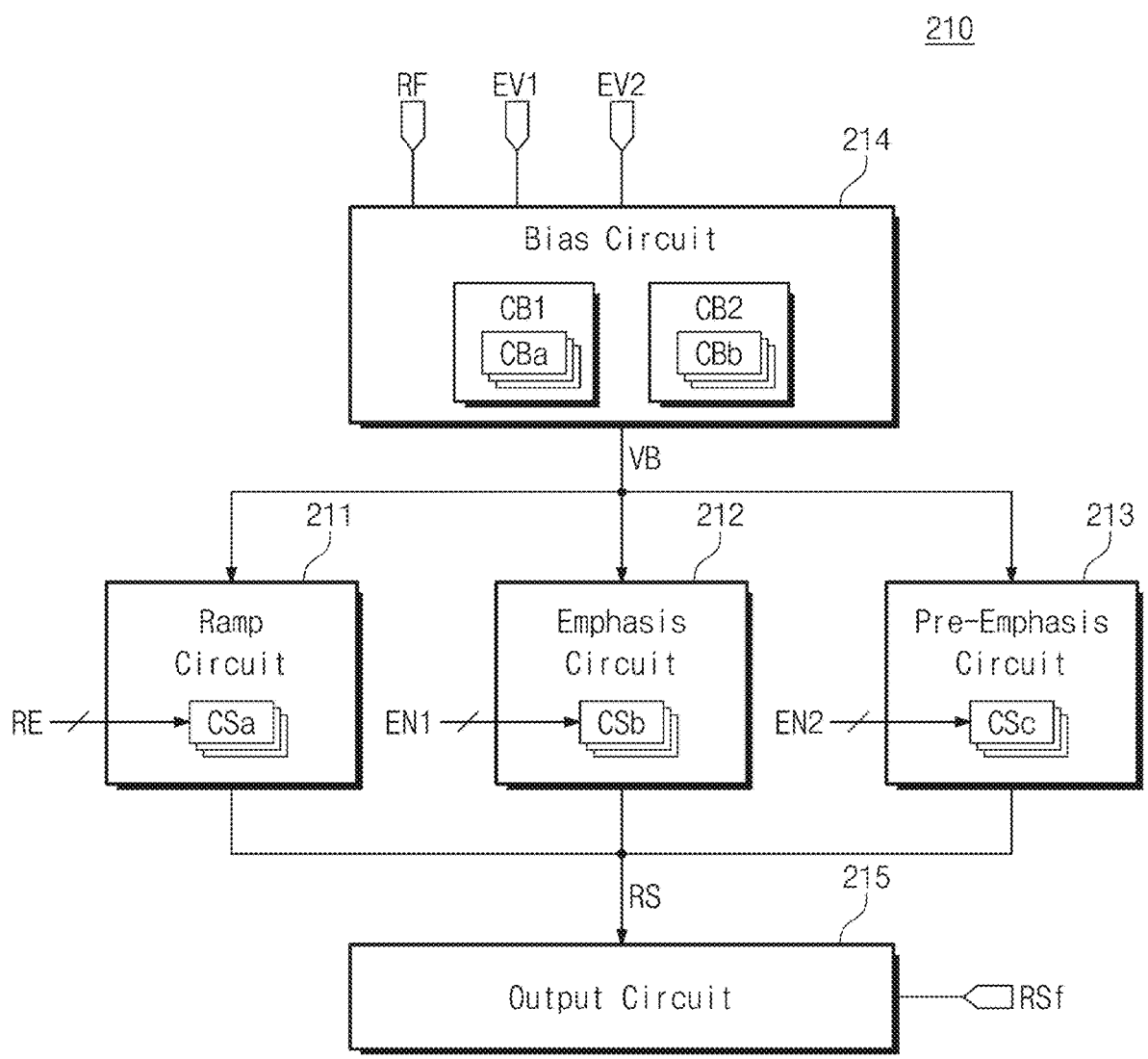
FIG. 7 is a block diagram of a ramp generator according to an embodiment of the present disclosure.

FIG. 7 is a block diagram of a ramp generator according to an embodiment of the present disclosure. Referring to FIG. 7, a ramp generator 210 may include a bias circuit 214, a ramp circuit 211, an emphasis circuit 212, a pre-emphasis circuit 213, and an output circuit 215. Characteristics of the ramp circuit 211, the emphasis circuit 212, and the pre-emphasis circuit 213 are the same as or similar to the ramp circuit 111, the emphasis circuit 112b, and the pre-emphasis circuit 113b of FIG. 3B, and thus, only differences will be described to avoid redundancy.

The bias circuit 214 may output the bias signal VB to the ramp circuit 211, the emphasis circuit 212, and the pre-emphasis circuit 213. In an embodiment, a level of a signal that the ramp circuit 211, the emphasis circuit 212, and the pre-emphasis circuit 213 output may be determined based on the bias signal VB. For example, as the level of the bias signal VB increases, a magnitude of a current of the signal that the emphasis circuit 212 and the pre-emphasis circuit 213 output may increase.

The bias circuit 214 may receive a reference signal RF, a first bias enable signal EV1, and a second bias enable signal EV2 from the control circuit 120. The bias circuit 214 may generate the bias signal VB based on the reference signal RF, the first bias enable signal EV1, and the second bias enable signal EV2.

The bias circuit 214 may include a first bias current cell CB1 and a second bias current cell CB2. The first bias current cell CB1 may include a plurality of bias current sources CBa. The plurality of bias current sources CBa may include a plurality of transistors. The plurality of bias current sources CBa may operate in response to the first bias enable signal EV1. In an embodiment, all the bias current sources CBa may be enabled in response to the first bias enable signal EV1.

The second bias current cell CB2 may include a plurality of bias current sources CBb. The plurality of bias current sources CBb may include a plurality of transistors. The plurality of bias current sources CBb may operate in response to the second bias enable signal EV2.

In an embodiment, a magnitude of a current flowing through the second bias current cell CB2 may be determined based on the second bias enable signal EV2. In an embodiment, the second bias enable signal EV2 may include a plurality of bias enable signals. The plurality of bias current sources CBb may be enabled in response to the plurality of bias enable signals, respectively. A magnitude of a current flowing through the second bias current cell CB2 may be determined depending on the number of bias current sources enabled from among the plurality of bias current sources CBb. For example, as the number of bias current sources enabled from among the plurality of bias current sources CBb increases, the magnitude of the current flowing through the second bias current cell CB2 may increase.

The bias circuit 214 is illustrated as outputting the bias signal VB controlling the ramp circuit 211, the emphasis circuit 212, and the pre-emphasis circuit 213, but the present disclosure is not limited thereto. For example, the bias circuit 214 may output a first bias signal controlling the ramp circuit 211, a second bias signal controlling the emphasis circuit 212, and a third bias signal controlling the pre-emphasis circuit 213.

The output circuit 215 may output a filter ramp signal RSf to the CDS circuit 150. The filter ramp signal RSf may be a signal that is obtained by removing a noise of the ramp signal RS. The output circuit 215 may generate the filter ramp signal RSf by removing a noise of the ramp signal RS that the ramp circuit 211, the emphasis circuit 212, and the pre-emphasis circuit 213 output. That is, the output circuit 215 may perform a role of a filter that removes a noise of a signal.

Figure 8:
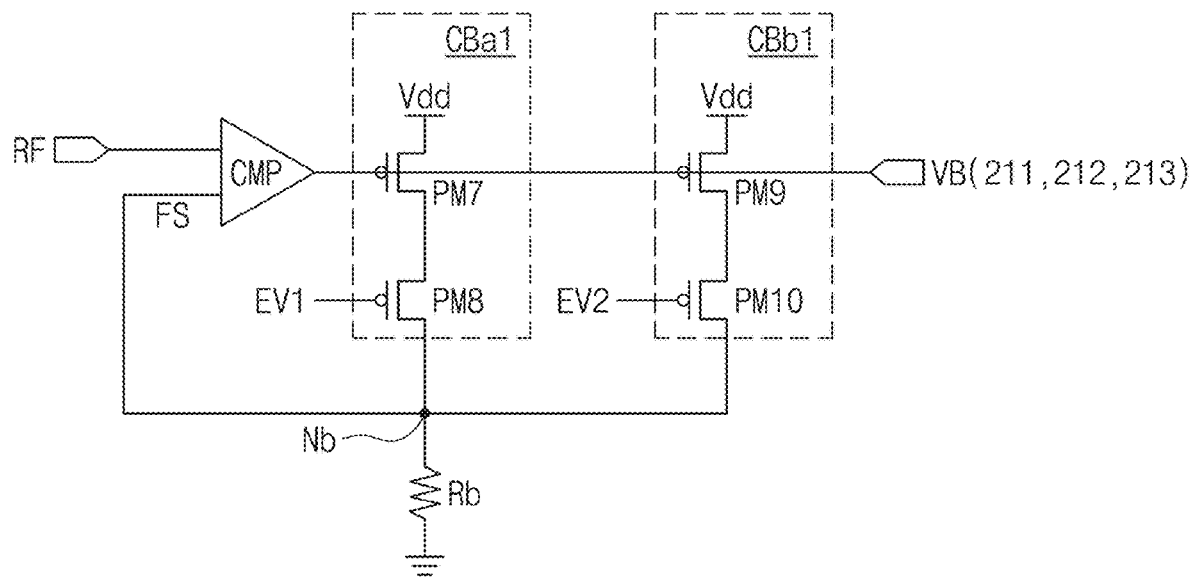
FIG. 8 is a circuit diagram illustrating a bias circuit of FIG. 7 in detail.

FIG. 8 is a circuit diagram illustrating a bias circuit of FIG. 7 in detail. The bias circuit 214 includes a comparator CMP, a first bias current source CBa1, a second bias current source CBb1, and a bias resistor Rb.

For brevity of drawing, the first bias current source CBa1 of the plurality of bias current sources CBa of the first bias current cell CB1 and the second bias current source CBb1 of the plurality of bias current sources CBb of the second bias current cell CB2 are illustrated. However, operations of the remaining bias current sources of the first bias current cell CB1 may be the same as or similar to an operation of the first bias current source CBa1, and operations of the remaining bias current sources of the second bias current cell CB2 may be the same as or similar to an operation of the second bias current source CBb1.

The comparator CMP may generate the bias signal VB based on the reference signal RF and a feedback signal FS. The comparator CMP may output the bias signal VB to the first bias current source CBa1 and the second bias current source CBb1. The feedback signal FS may be a signal that the first bias current cell CB1 and the second bias current cell CB2 generate based on the bias signal VB.

The first bias current source CBa1 may be connected with the second bias current source CBb1 through a bias node Nb for outputting the feedback signal FS. The first bias current source CB al may include seventh and eighth PMOS transistors PM7 and PM8. The seventh and eighth PMOS transistors PM7 and PM8 may be connected in series between the power node and the bias node Nb. The seventh PMOS transistor PM7 may operate in response to the bias signal VB. The eighth PMOS transistor PM8 may operate in response to the first bias enable signal EV1.

The first bias current source CBa1 is illustrated as including the seventh and eighth PMOS transistors PM7 and PM8, but the present disclosure is not limited thereto. For example, the first bias current source CBa1 may further include PMOS transistors or may be implemented to be different from that illustrated in FIG. 8.

The second bias current source CBb1 may include ninth and tenth PMOS transistors PM9 and PM10. The ninth and tenth PMOS transistors PM9 and PM10 may be connected in series between the power node and the bias node Nb. The ninth PMOS transistor PM9 may operate in response to the bias signal VB. The tenth PMOS transistor PM10 may operate in response to the second bias enable signal EV2.

A gate node of the seventh PMOS transistor PM7 and a gate node of the ninth PMOS transistor PM9 may be connected with gate nodes of the PMOS transistors of the ramp circuit 211, the emphasis circuit 212, and the pre-emphasis circuit 213. As such, the seventh PMOS transistor PM7 and the ninth PMOS transistor PM9 may constitute a current mirror circuit together with the PMOS transistors of the ramp circuit 211, the emphasis circuit 212, and the pre-emphasis circuit 213.

The second bias current source CBb1 is illustrated as including the ninth and tenth PMOS transistors PM9 and PM10, but the present disclosure is not limited thereto. For example, the second bias current source CBb1 may further include PMOS transistors or may be implemented to be different from that illustrated in FIG. 8.

The bias resistor Rb may be connected with the first bias current source CBa1 and the second bias current source CBb1 through the bias node Nb. The bias resistor Rb may be connected between the bias node Nb and the ground node.

Figure 9:
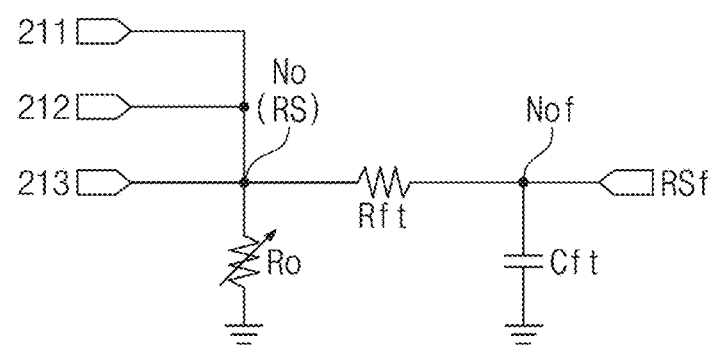
FIG. 9 is a circuit diagram illustrating an output circuit of FIG. 7 in detail.

FIG. 9 is a circuit diagram illustrating an output circuit of FIG. 7 in detail. Referring to FIG. 9, the output circuit 215 includes the output resistor Ro, a filter resistor Rft, and a filter capacitor Cft. The output resistor Ro is the same as or similar to the output resistor Ro of FIG. 3A, and thus, additional description will be omitted to avoid redundancy.

The output circuit 215 may output the filter ramp signal RSf. The output circuit 215 may be connected with the ramp circuit 211, the emphasis circuit 212, and the pre-emphasis circuit 213 through the output node No.

The filter resistor Rft may be connected between the output node No and a filter output node Nof for outputting the filter ramp signal RSf. The filter capacitor Cft may be connected between the filter output node Nof and the ground node.

The filter resistor Rft and the filter capacitor Cft may reduce or block a noise of the ramp signal RS to output the filter ramp signal RSf. For example, the filter resistor Rft and the filter capacitor Cft may constitute a low pass filter.

Figure 10:
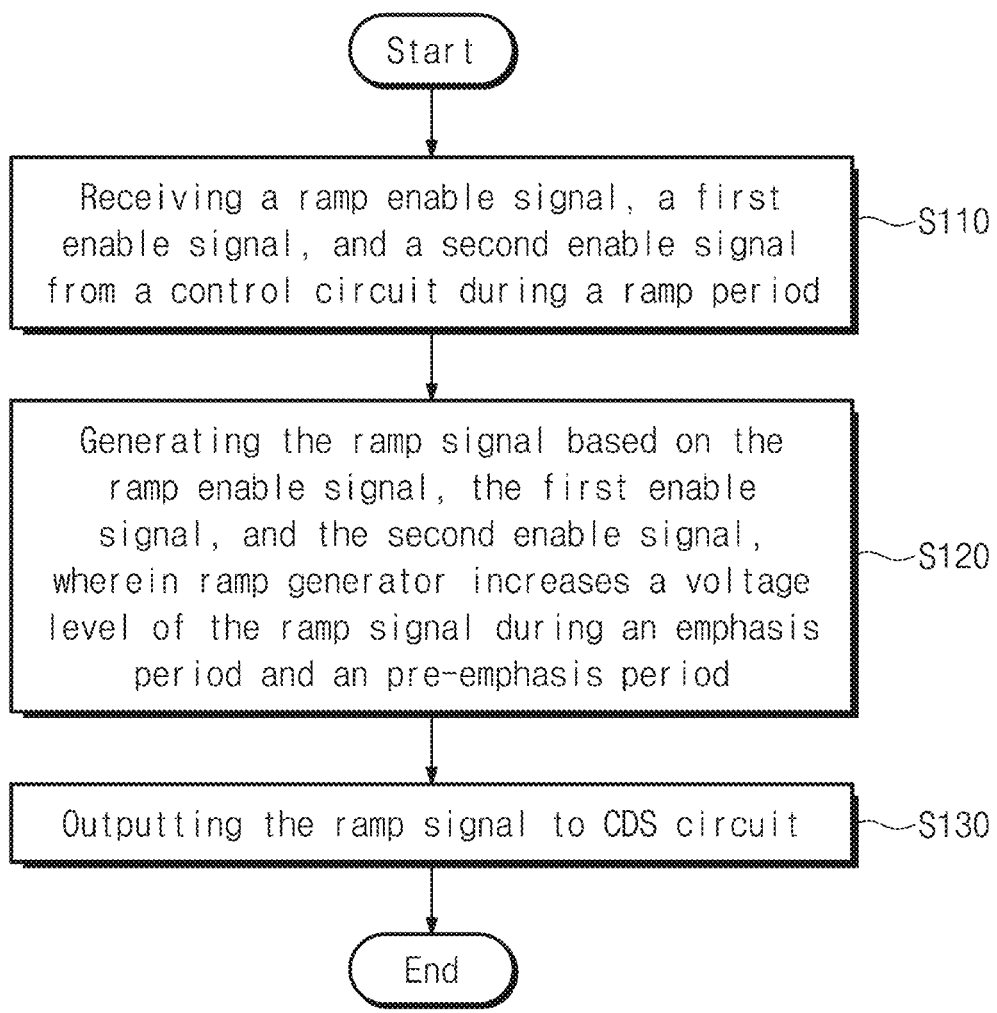
FIG. 10 is a flowchart illustrating an operation of a ramp generator in detail, according to an embodiment of the present disclosure.

FIG. 10 is a flowchart illustrating an operation of a ramp generator in detail, according to an embodiment of the present disclosure. For convenience of description, with regard to above-described components and operations, additional description will be omitted to avoid redundancy. An operation of the ramp generator 110 will be described with reference to FIGS. 3A and 10.

In operation S110, the ramp generator 110 may receive the ramp enable signal RE, the first enable signal EN1, and the second enable signal EN2 from the control circuit 120 during the ramp period from a first time point to a second time point.

In operation S120, the ramp generator 110 may generate the ramp signal RS based on the ramp enable signal RE, the first enable signal EN1, and the second enable signal EN2. In an embodiment, the ramp generator 110 may control a voltage level of the ramp signal RS based on the first enable signal EN1, and the second enable signal EN2.

For example, the ramp generator 110 may perform operations of generating the ramp signal RS based on the ramp enable signal RE during the ramp period, increasing a voltage level of the ramp signal RS during an emphasis period in the ramp period, and further increasing the voltage level of the ramp signal RS during a pre-emphasis period in the ramp period. A length of the pre-emphasis period may be shorter than a length of the emphasis period. As the voltage level of the ramp signal RS increases during the emphasis period and the pre-emphasis period, the linearity of the ramp signal RS may be improved.

In operation S130, the ramp generator 110 may output the ramp signal RS to the CDS circuit 150. As the ramp generator 110 outputs the ramp signal RS, the linearity of which is improved, to the CDS circuit 150, the reliability of operation of the CDS circuit 150 may be improved.

Figure 11:
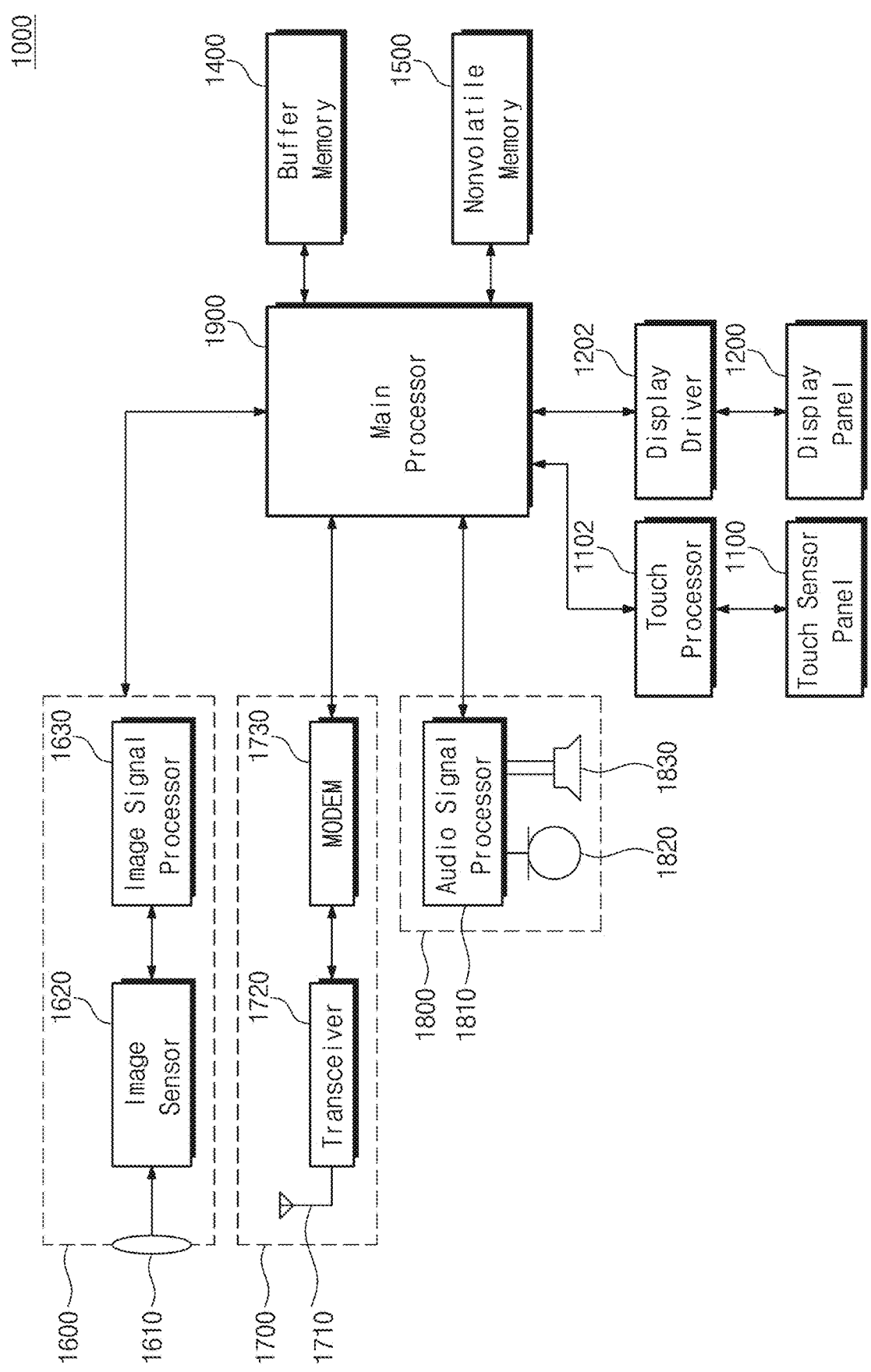
FIG. 11 is a block diagram of an electronic device including a multi-camera module according to some embodiments of the present disclosure.
Figure 12:
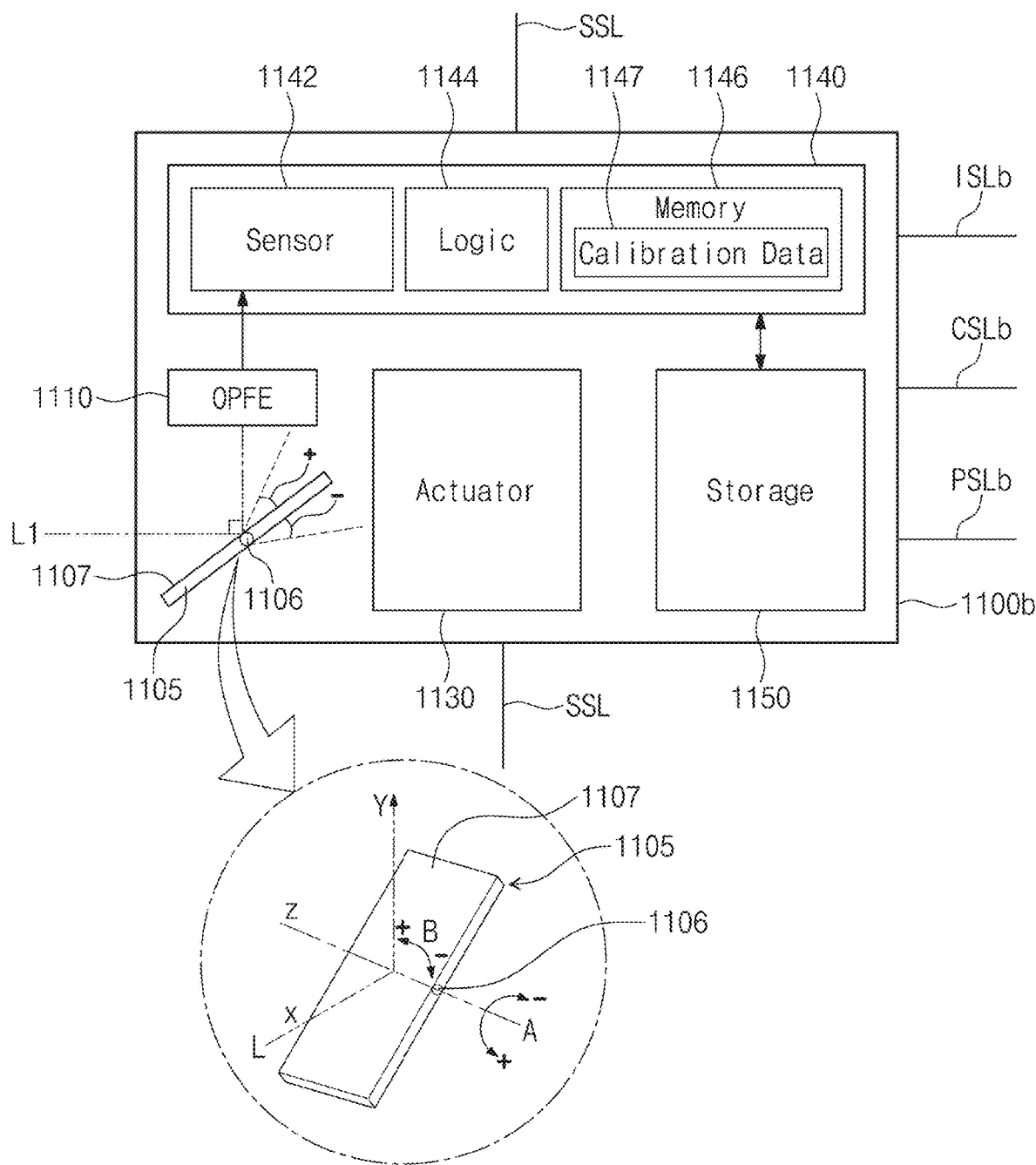
FIG. 12 is a block diagram illustrating a camera module of FIG. 11 in detail, according to some embodiments of the present disclosure.

FIG. 11 is a block diagram of an electronic device including a multi-camera module according to some embodiments of the present disclosure. FIG. 12 is a block diagram illustrating a camera module of FIG. 11 in detail, according to some embodiments of the present disclosure.

Referring to FIG. 11, an electronic device 1000 may include a camera module group 1100, an application processor 1200, a PMIC 1300, and external memory 1400. The camera module group 1100 may include a plurality of camera modules 1100a, 1100b, and 1100c.

Each of the plurality of camera modules 1100a, 1100b, and 1100c may include an image sensor according to an embodiment of the present disclosure. For example, each of the plurality of camera modules 1100a, 1100b, and 1100c may include the image sensor 100 of FIGS. 1 and 2. The image sensor may include an emphasis circuit and a pre-emphasis circuit. The emphasis circuit and the pre-emphasis circuit may control a voltage of a ramp signal. The image sensor may perform the operation method of FIG. 10.

Below, a detailed configuration of the camera module 1100b will be more fully described with reference to FIG. 12, but the following description may be equally applied to the remaining camera modules 1100a and 1100c.

Referring to FIG. 12, the camera module 1100b may include a prism 1105, an optical path folding element (OPFE) 1110, an actuator 1130, an image sensing device 1140, and storage 1150. The prism 1105 may include a reflecting plane 1107 of a light reflecting material and may change a path of a light "L" incident from the outside. The prism 1105 may change the path of the light "L" incident in an X-axis direction to a Y-axis direction perpendicular to the X-axis direction by rotating the reflecting plane 1107 of the light reflecting material in direction "A" about a central axis 1106 or rotating the central axis 1106 in direction "B". The actuator 1130 may move the OPFE 1110 or an optical lens (hereinafter referred to as an "optical lens") to a specific location.

The image sensing device 1140 may include an image sensor 1142, control logic 1144, and a memory 1146. The image sensor 1142 may sense an image of a sensing target by using the light "L" provided through an optical lens.

The control logic 1144 may control an overall operation of the camera module 1100b. The memory 1146 may store information, which is necessary for an operation of the camera module 1100b, such as calibration data 1147. The storage 1150 may store image data sensed through the image sensor 1142.

Returning to FIG. 11, the application processor 1200 may include an image processing device 1210, a memory controller 1220, and an internal memory 1230. The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c Image data respectively generated from the camera modules 1100a, 1100b, and 1100c may be respectively provided to the corresponding sub image processors 1212a, 1212b, and 1212c through image signal lines ISLa, ISLb, and ISLc.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on image generating information Generating Information or a mode signal, and the remaining camera modules (e.g., 1100a and 1100c) may be designated as a slave camera. The above information may be included in the control signals so as to be respectively provided to the corresponding camera modules 1100a, 1100b, and 1100c through the control signal lines CSLa, CSLb, and CSLc separated from each other.

In some embodiments, the control signal provided from the camera module controller 1216 to each of the camera modules 1100a, 1100b, and 1100c may include a sync enable signal. The camera module 1100b that is provided with the sync enable signal may generate a sync signal and may provide the generated sync signal to the camera modules 1100a and 1100c through a sync signal line SSL.

The PMIC 1300 may supply a power, for example, a power supply voltage to each of the plurality of camera modules 1100a, 1100b, and 1100c.

According to an embodiment of the present disclosure, there is provided a ramp generator capable of providing a ramp signal in which there is improved the linearity of a period where a voltage level decreases.

According to an embodiment of the present disclosure, a ramp generator including an emphasis circuit and a pre-emphasis circuit, a method of operating the ramp generator, and an image sensor device including the ramp generator are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A ramp generator, comprising:
a ramp circuit configured to receive a first ramp enable signal from a control circuit during a first ramp period, the first ramp period including a first reset period and a first sensing period, and the ramp circuit being configured to output a first ramp signal to a correlated double sample (CDS) circuit;
an emphasis circuit configured to increase a voltage level of the first ramp signal during the first reset period, based on a first enable signal received from the control circuit; and
a pre-emphasis circuit configured to further increase the voltage level of the first ramp signal during a first pre-emphasis period in the first reset period, based on a second enable signal received from the control circuit.

2. The ramp generator of claim 1, wherein
the first ramp period is a period from a first time point to a second time point,
the first reset period is a period between the first time point and a third time point earlier than the second time point,
the first pre-emphasis period is a period between the first time point and a fourth time point earlier than the third time point, and
the first sensing period is a period from the third time point to the second time point.

3. The ramp generator of claim 1, wherein
the first ramp period is a period from a first time point to a second time point,
a voltage level of the first enable signal is a first logic level in a period between the first time point and a third time point earlier than the second time point, and is changed from the first logic level to a second logic level at the third time point, and
a voltage level of the second enable signal is the first logic level in a period between the first time point and a fourth time point earlier than the third time point, and is changed from the first logic level to the second logic level at the fourth time point.

4. The ramp generator of claim 1, wherein
the emphasis circuit is further configured to generate a first portion of the voltage level of the first ramp signal based on the first enable signal, and
the pre-emphasis circuit is further configured to generate a second portion of the voltage level of the first ramp signal based on the second enable signal.

5. The ramp generator of claim 4, further comprising:
a bias circuit configured to output a first bias signal to the ramp circuit, the emphasis circuit, and the pre-emphasis circuit.

6. The ramp generator of claim 5, wherein
the emphasis circuit includes a first PMOS transistor and a second PMOS transistor connected in series between a power node configured to receive a power supply voltage and an output node at which the first ramp signal is formed,
the first PMOS transistor is configured to operate based on the first bias signal, and
the second PMOS transistor is configured to turn on in response to a first logic level of the first enable signal, and the first logic level is a logic low level.

7. The ramp generator of claim 5, wherein
the pre-emphasis circuit includes a third PMOS transistor and a fourth PMOS transistor connected in series between a power node configured to receive a power supply voltage and an output node at which the first ramp signal is formed,
the third PMOS transistor is configured operate based on the first bias signal, and
the fourth PMOS transistor is configured turn on in response to a first logic level of the second enable signal, and the first logic level is a logic low level.

8. The ramp generator of claim 4, wherein
the emphasis circuit includes a plurality of emphasis current sources, and the pre-emphasis circuit includes a plurality of pre-emphasis current sources, and
a magnitude of the first portion corresponds to a number of the plurality of emphasis current sources, and a magnitude of the second portion corresponds to a number of the plurality of pre-emphasis current sources.

9. The ramp generator of claim 4, further comprising:
a bias circuit configured to output a first bias signal to the ramp circuit, to output a second bias signal to the emphasis circuit, and to output a third bias signal to the pre-emphasis circuit.

10. The ramp generator of claim 9, wherein
a magnitude of the first portion corresponds to a level of the second bias signal, and a magnitude of the second portion corresponds to a level of the third bias signal, and
the magnitude of the first portion and the magnitude of the second portion are different from each other.

11. The ramp generator of claim 4, further comprising:
a variable resistor connected between an output node at which the first ramp signal is formed and a ground node,
wherein the output node is connected with the ramp circuit, the emphasis circuit, and the pre-emphasis circuit, and
wherein a magnitude of the first portion is proportional to a resistance value of the variable resistor, and a magnitude of the second portion is proportional to the resistance value of the variable resistor.

12. The ramp generator of claim 1, wherein
the ramp circuit is further configured to receive a second ramp enable signal from the control circuit during a second ramp period, the second ramp period includes a second reset period and a second sensing period, and the ramp circuit is configured to output a second ramp signal to the CDS circuit, the emphasis circuit is configured to increase a voltage level of the second ramp signal during the second reset period, based on a third enable signal received from the control circuit, and
a length of the second ramp period is longer than a reference length.

13. An image sensor device comprising:
a pixel circuit configured to output a pixel signal based on an external light signal;
a ramp generator configured to output a first ramp signal;
a correlated double sampling (CDS) circuit configured to perform correlated sampling based on the pixel signal and the first ramp signal; and
a control circuit connected with the pixel circuit, the CDS circuit, and the ramp generator, and configured to generate a first ramp enable signal, a first enable signal, and a second enable signal,
wherein the ramp generator includes
a ramp circuit configured to receive the first ramp enable signal during a first ramp period, the first ramp period including a first reset period and a first sensing period, and the ramp circuit being configured to output the first ramp signal to the CDS circuit;
an emphasis circuit configured to receive the first enable signal from the control circuit and to increase a voltage level of the first ramp signal during the first reset period, based on the first enable signal; and
a pre-emphasis circuit configured to receive the second enable signal from the control circuit, and to further increase the voltage level of the first ramp signal during a first pre-emphasis period in the first reset period, based on the second enable signal.

14. The image sensor device of claim 13, wherein
the first ramp period is a period from a first time point to a second time point,
the first reset period is a period between the first time point and a third time point earlier than the second time point,
the first pre-emphasis period is a period between the first time point and a fourth time point earlier than the third time point, and
the first sensing period is a period from the third time point to the second time point.

15. The image sensor device of claim 13, wherein
the first ramp period is a period from a first time point to a second time point,
a voltage level of the first enable signal is a first logic level in a period between the first time point and a third time point earlier than the second time point, and is changed from the first logic level to a second logic level at the third time point, and
a voltage level of the second enable signal is the first logic level in a period between the first time point and a fourth time point earlier than the third time point, and is changed from the first logic level to the second logic level at the fourth time point.

16. The image sensor device of claim 13, wherein the control circuit is further configured to:
receive a clock signal;
determine whether a length of a toggling period of the clock signal is longer than a reference length; and
in response to determining that the length of the toggling period of the clock signal is longer than the reference length, disable the pre-emphasis circuit during a second ramp period, the second ramp period including a second reset period and a second sensing period.

17. The image sensor device of claim 16, wherein, in response to the control circuit disabling the pre-emphasis circuit during the second ramp period,
- the ramp circuit is configured to receive a second ramp enable signal from the control circuit during the second ramp period and to output a second ramp signal to the CDS circuit, and
- the emphasis circuit is configured to increase a voltage level of the second ramp signal during the second reset period, based on a third enable signal received from the control circuit.

18. The image sensor device of claim 13, wherein
- the emphasis circuit is further configured to generate a first portion of the voltage level of the first ramp signal based on the first enable signal, and
- the pre-emphasis circuit is configured to generate a second portion of the voltage level of the first ramp signal based on the second enable signal.

19. The image sensor device of claim 18, wherein
- the emphasis circuit includes a plurality of emphasis current sources, and the pre-emphasis circuit includes a plurality of pre-emphasis current sources, and
- a magnitude of the first portion corresponds to a number of the plurality of emphasis current sources, and a magnitude of the second portion corresponds to a number of the plurality of pre-emphasis current sources.

20. A method of operating a ramp generator, the method comprising:
- receiving a ramp enable signal, a first enable signal, and a second enable signal from a control circuit during a ramp period;
- generating the ramp signal based on the ramp enable signal, the first enable signal, and the second enable signal; and
- outputting the ramp signal to a correlated double sampling (CDS) circuit,
- wherein the generating of the ramp signal includes,
  - generating the ramp signal based on the ramp enable signal during the ramp period;
  - increasing a voltage level of the ramp signal based on the first enable signal, during an emphasis period in the ramp period; and
  - further increasing the voltage level of the ramp signal based on the second enable signal, during a pre-emphasis period in the ramp period, and
- wherein a length of the pre-emphasis period is shorter than a length of the emphasis period.

* * * * *